(12) United States Patent  (10) Patent No.: US 9,079,466 B2
Bailey  (45) Date of Patent: Jul. 14, 2015

(54) AMPHIBIOUS VEHICLE

(75) Inventor: Stephen James Bailey, Lutterworth (GB)

(73) Assignee: Gibbs Technologies Ltd., Warwickshire (GB)

( * ) Notice: Subject to any disclaimer, the term of this patent is extended or adjusted under 35 U.S.C. 154(b) by 590 days.

(21) Appl. No.: 12/443,144

(22) PCT Filed: Oct. 1, 2007

(86) PCT No.: PCT/GB2007/003723
§ 371 (c)(1),
(2), (4) Date: Jan. 29, 2010

(87) PCT Pub. No.: WO2008/038029
PCT Pub. Date: Apr. 3, 2008

(65) Prior Publication Data
US 2010/0144220 A1  Jun. 10, 2010

(30) Foreign Application Priority Data
Sep. 29, 2006  (GB) .................................. 0619244.7

(51) Int. Cl.
*B63H 19/08*  (2006.01)
*B60F 3/00*  (2006.01)

(52) U.S. Cl.
CPC .......... *B60F 3/0007* (2013.01); *B60F 2301/02* (2013.01); *B60F 2301/04* (2013.01)

(58) Field of Classification Search
USPC .................................. 440/12.5, 12.52, 12.54
IPC ........................................................... B60F 3/00
See application file for complete search history.

(56) References Cited

U.S. PATENT DOCUMENTS 3,895,596 A * 7/1975 Amour ....................... 440/12.66
4,008,679 A   2/1977 Bozzano
5,769,021 A * 6/1998 Schad .......................... 440/12.5

(Continued)

FOREIGN PATENT DOCUMENTS

CN    87103918 A   12/1988
CN    1355746 A    6/2002

(Continued)

OTHER PUBLICATIONS

GB0619244.7 Search Report dated Dec. 20, 2006.

(Continued)

*Primary Examiner* — Stephen Avila
(74) *Attorney, Agent, or Firm* — Fulwider Patton LLP

(57) ABSTRACT

Amphibious vehicle 10 has both land propulsion capability as well as marine propulsion capability. At least two axles with wheels 12 are spaced apart along the length of the vehicle. At least one intermediate axle with retractable wheel(s) 14 is positioned between the other axles. This additional axle may improve manoeuvrability over rough ground. Wheel(s) 14 may be retracted on water and/or on land. Wheels 12may also be retractable. One or more axles may be driven, full time or selectively. The vehicle may plane on water, and may have a vee type hull (11 FIG. 2). Marine propulsion may be by means of a jet drive. Wheel(s) 14 may retract vertically or through arcs around a longitudinal axis of the vehicle. Skid steer may be used. Mudguards, a vehicle roof, and retraction guides for the wheels (slides 16, FIG. 2) may be fitted. Pairs of slides may provide roof supports. A forward control driving position may be provided.

42 Claims, 4 Drawing Sheets

(56) References Cited

U.S. PATENT DOCUMENTS

| | | | |
|---|---|---|---|
| 6,505,694 B2 | 1/2003 | Maguire | |
| 6,840,825 B1 | 1/2005 | Messano | |
| 6,981,461 B1* | 1/2006 | Burg | 114/67 R |
| 7,410,396 B2* | 8/2008 | Longdill et al. | 440/12.54 |
| 7,478,817 B1* | 1/2009 | Carrier | 180/6.48 |
| 2005/0003715 A1* | 1/2005 | Hewitt | 440/12.5 |
| 2006/0148340 A1* | 7/2006 | Gibbs | 440/12.52 |
| 2006/0172628 A1 | 8/2006 | Longdill et al. | |
| 2007/0093148 A1* | 4/2007 | Gibbs et al. | 440/12.5 |

FOREIGN PATENT DOCUMENTS

| | | |
|---|---|---|
| EP | 0060209 A1 | 9/1982 |
| FR | 2758304 A1 | 7/1998 |
| GB | 1287632 A | 9/1972 |
| JP | 57160704 A1 | 10/1982 |
| JP | 03529487 A1 | 10/2003 |
| SU | 1011399 A1 | 4/1983 |
| WO | 0174612 A | 10/2001 |
| WO | 03051712 A | 6/2003 |
| WO | 2006043088 A1 | 4/2006 |
| WO | 2006043101 A1 | 4/2006 |
| WO | 2007141515 A | 12/2007 |
| WO | 2007141515 A1 | 12/2007 |

OTHER PUBLICATIONS

PCT/GB2007/003723, Search Report dated Oct. 29, 2009.
2007-80043442.2 First Office Action dated Nov. 17, 2010.
2007-80043442.2 Second Office Action dated Mar. 15, 2012.
JP App No. 2009-529772 Office Action dated Oct. 11, 2011.
4WD Online.com OT65—Article (Undated).
No tanks necessary; Russian luxury personnel carrier—Autoblog—Article dated Nov. 1, 2006.
Examination Report, Application No. 07823980.3 to Gibbs Technologies Ltd. dated Jan. 19, 2015.

* cited by examiner

AMPHIBIOUS VEHICLE

Related Applications:

This application is a U.S. national phase of PCT/GB2007/003723, filed Oct. 1, 2007, which claims priority from Great Britain Application Serial No. 0619244.7, filed Sept. 29, 2006.

The present invention relates to an amphibious vehicle, and in particular to an amphibious vehicle which is provided with at least one intermediate axle supporting a wheel which is retractable above the vehicle waterline.

Placement of axles in a conventional off-road vehicle is a compromise between breakover angle on the one hand and approach and departure angles on the other hand. FIG. 12 illustrates these angles for a vehicle 500. A front wheel 503 is mounted on a front axle, and a rear wheel 504 is mounted on a rear axle. The axles have to be inset from the outer ends 505, 506 of the vehicle to give an acceptable breakover angle 507, but this limits mobility by reducing the approach angle 501 and departure angle 502. It is also conventional to inset axles from bumpers to build in crushable space for impact absorption. However, where mobility off-road is the prime concern, the fitment of an intermediate axle or axles each supporting a wheel and provided between front and rear axles makes breakover angle 507 an irrelevant concept. The vehicle will not ground on its sills between the axles, because the additional wheel or wheels are there to support it. This allows the front and rear axles to be pushed out towards the bumpers, maximizing approach and departure angles 501, 502.

Multiple axle off-road vehicles have many advantages off-road, but are limited on road. They may suffer tyre scrub where single axle steering is used; multiple axle steering adds complexity, weight and cost. They are often noisy, and typically use a lot of fuel. In an age where relations between military forces and civilians are often fraught, any modification to military vehicles which makes their passage along public roads less conspicuous, and less likely to induce hostility, is a major advantage.

Four wheeled vehicles may be adapted for use off road by providing balloon tyres and elongated suspension travel in both bump and rebound modes (see, for example the Doliner Go-Devil at www.amphibiousvehicle.net).

However, these modifications may limit speed, economy, and ease of handling on road. Provision of retractable intermediate axles allows tyres and suspension to be tuned more to road use, and may avoid use of balloon tyres which have speed limits on road.

The present invention provides, in a first aspect, an amphibious vehicle for use on land and on water, comprising land propulsion means and marine propulsion means, wherein the land propulsion means comprises at least two axles spaced apart along the length of the vehicle and at least one intermediate axle positioned therebetween, the at least one intermediate axle supporting at least one wheel which may be retracted above the vehicle waterline for use of the vehicle on water and/or on land.

In a second aspect, the present invention provides an amphibious vehicle for use on land and on water, comprising land propulsion means, marine propulsion means, at least two wheels spaced apart along the length of the vehicle and at least one intermediate wheel positioned therebetween, wherein the at least one intermediate wheel is retractable in use of the vehicle on water and/or on land.

According to other aspects of the present invention, there is provided an amphibious vehicle as set forth in the appended claims.

Preferred embodiments of the present invention will now be described, by way of example only, with reference to the accompanying drawings in which.

Figure 1:
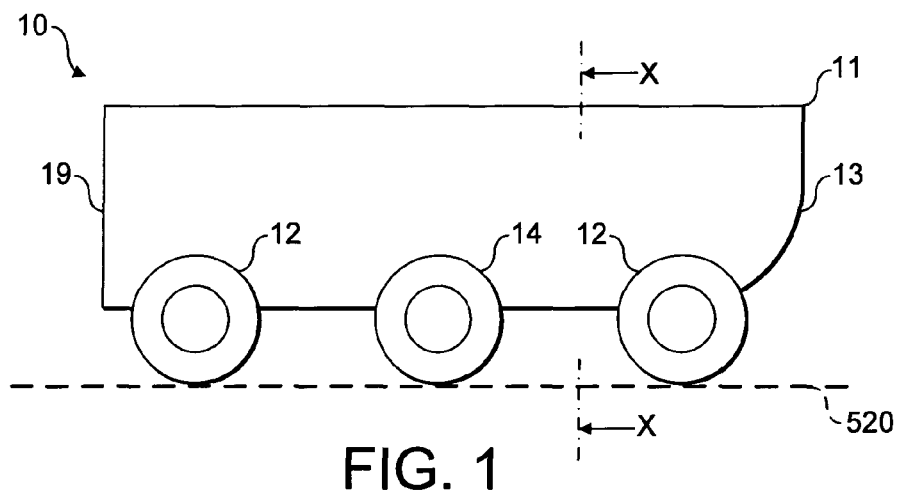
FIG. 1 is a schematic side elevation view of a first embodiment of amphibious vehicle according to the present invention on land with all axles protracted.

FIG. 1 shows an amphibious vehicle 10 having a main vehicle structure in the form of a hull 11. The vehicle has a front (bow) 13 and a rear (stern) 19. The vehicle 10 is propelled on land by means of wheels 12, 14 provided longitudinally along each side of the hull 11. Each wheel 12, 14 is supported on a retractable axle (not shown). The wheels 12, 14 may all be driven wheels or may comprise one or more driven wheels and one or more non-driven wheels. The vehicle 10 may be steered conventionally using the front wheels and/or by independently operating the wheels 12, 14 on each side of the hull 11 (e.g. by braking or reversing certain wheels, i.e. by skid-steer).

This arrangement is advantageous off-road, where the wheels 12, 14 can engage the terrain surface even over rugged terrain. The wheels 12, 14 allow for improved steering compared to tracked vehicles, particularly on hard surfaces.

Figure 2:
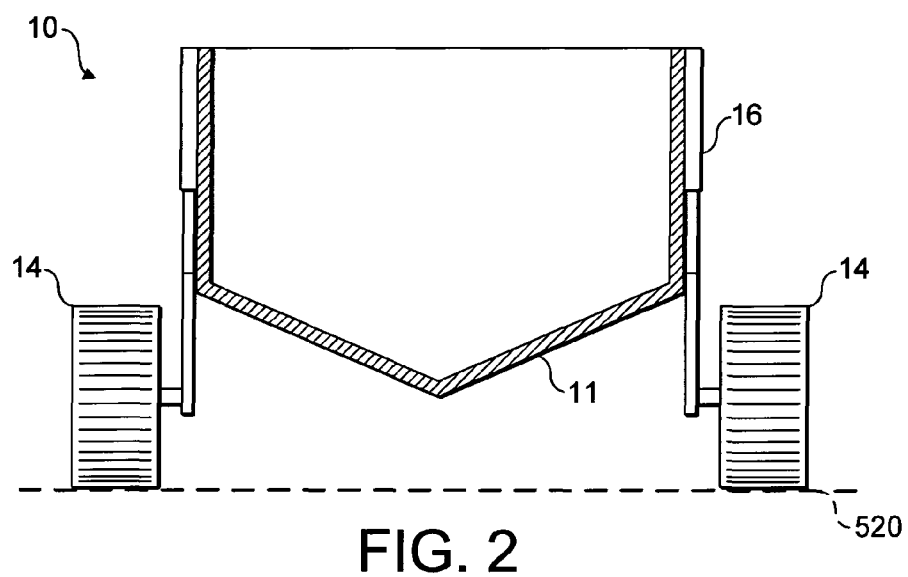
FIG. 2 is a schematic transverse cross-section view of the amphibious vehicle of FIG. 1 taken at X-X.

The hull 11 is a vee type hull as shown in FIG. 2. The vehicle 10 additionally has a marine propulsion means for travelling on water. This is preferably in the form of at least one jet drive (not shown). The jet drive is able to generate sufficient thrust to allow the vehicle 10 to plane on water.

FIG. 2 shows a schematic cross-sectional view of the amphibious vehicle 10 illustrated in FIG. 1 looking back from the front at position X-X. Each intermediate axle supporting a wheel 14 has at least one guide element located in one or more slides 16. The slides 16 extend substantially vertically adjacent the hull 11, and allow the intermediate axles supporting a wheel 14 to be raised or lowered substantially vertically. The slides 16 may be in the form of tubes. The slides 16 are arranged in pairs across the width of the vehicle 10. Pairs of slides 16 may be attached to each other across the width of the vehicle 10 by attachment elements (not shown).

Hydraulic rams (not shown) are connected to the intermediate axles supporting a wheel 14, and are operable to raise or lower the intermediate axles supporting a wheel 14 in the slides 16. The intermediate axles supporting a wheel 14 can be raised until they are above the waterline of the vehicle 10. This allows the vehicle 10 to plane on water without interference or drag from the intermediate axles supporting a wheel 14. The intermediate axles supporting a wheel 14 are raisable above the level of any rudder. All protraction operations are inverse to the retraction operations described.

The hydraulic rams may additionally provide for suspension springing of the vehicle 10. The hydraulic rams may additionally provide suspension damping for the vehicle, as known from WO 01/74612 which is incorporated herein by reference.

A cover or roof (not shown) may be supported by the slides 16. The cover or roof may be attached to the attachment elements. The cover may provide physical protection for occupants of the vehicle in a military conflict, for example providing protection from enemy fire.

Figure 3:
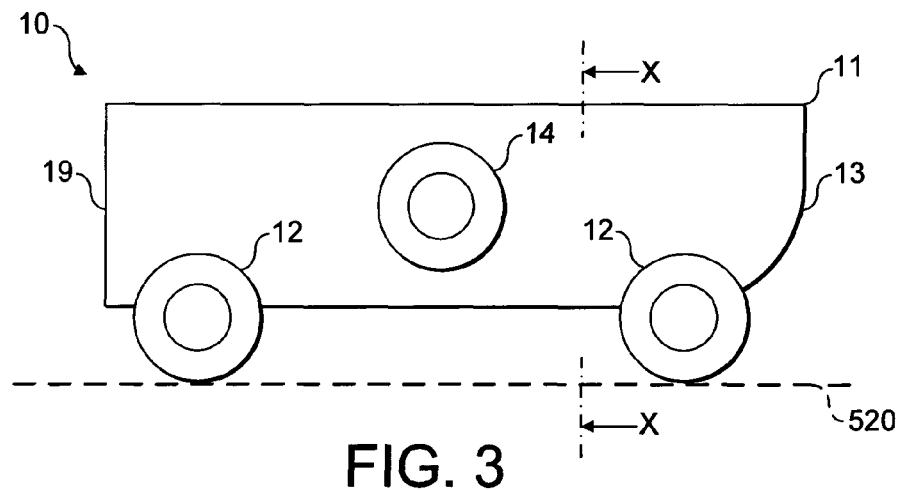
FIG. 3 is a schematic side elevation view of the amphibious vehicle of FIG. 1 on land with the intermediate axle retracted.

FIG. 3 shows the amphibious vehicle of FIG. 1 in which the intermediate axles supporting a wheel 14 have been raised upwardly (retracted). The intermediate axles supporting a wheel 14 are raised above the level of the waterline 540 of the vehicle 10 (see FIG. 5). Conventional front and rear axles supporting wheels 12 are shown in the protracted position with the wheels 12 on the ground, so as to drive and steer the vehicle 10. This state is advantageous on roads, where the wheels 12 allow relatively fast, quiet travel and allow smooth steering of the amphibious vehicle 10.

Figure 4:
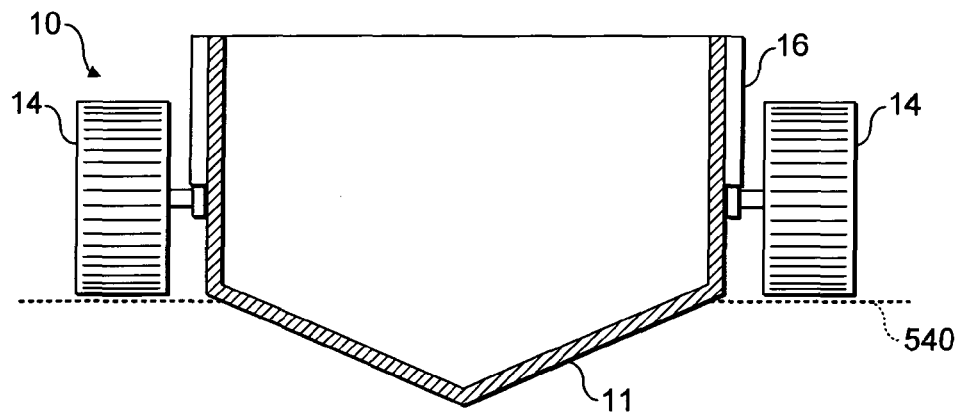
FIG. 4 is a schematic transverse cross-section view of the amphibious vehicle of FIG. 3 taken at X-X.

FIG. 4 shows a schematic cross-sectional view of the amphibious vehicle 10 illustrated in FIG. 3 looking back from the front at position X-X. Each intermediate axle supporting a wheel 14 is shown in the retracted position. The wheels 12 may also be raised in slides 16, or by any other means for retracting wheels.

Figure 5:
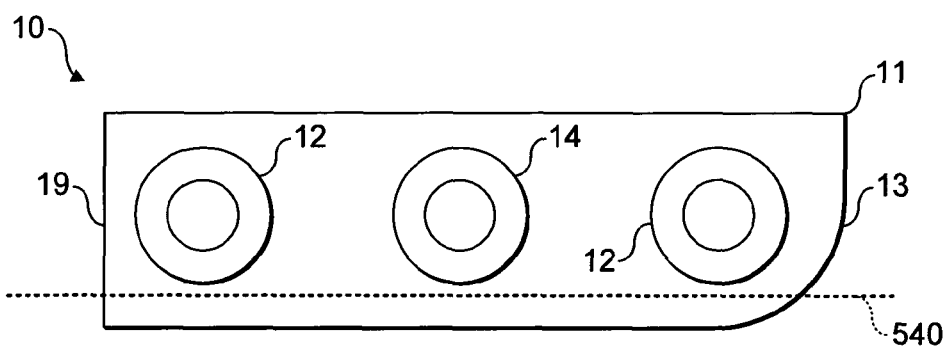
FIG. 5 is a schematic side elevation view of the amphibious vehicle of FIG. 1 on water with all axles retracted.

FIG. 5 shows the front and rear wheels 12 retracted in addition to the intermediate retracted wheels 14. This allows the amphibious vehicle 10 to travel on water, where it is propelled by a jet drive. The wheels 12, 14 are raised above the waterline 540, allowing the vehicle 10 to plane on the water without interference from the wheels 12, 14.

Figure 6:
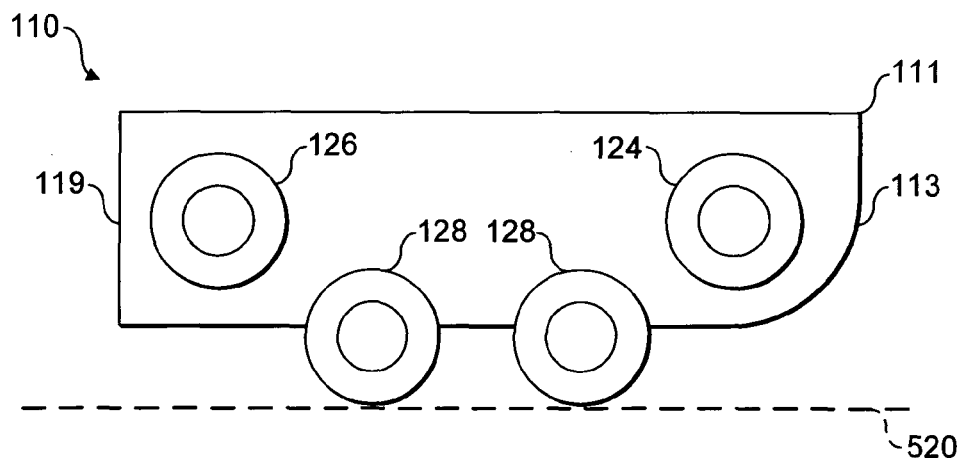
FIG. 6 is a schematic side elevation view of a second embodiment of amphibious according to the present invention on land provided with two intermediate axles.

FIG. 6 shows a second embodiment of amphibious vehicle 110. The vehicle 110 is provided with a hull 111 having a front (bow) 113 and a rear (stern) 119. The vehicle 110 has a front pair of wheels 124 and a rear pair of wheels 126 (all shown retracted). Two pairs of intermediate axles supporting wheels 128 are located between the front and rear wheels 124, 126, each pair of wheels 128 on either side of the vehicle 110 (all shown protracted). All or any of the front and rear wheels 124, 126 and the intermediate axles supporting a wheel 128 can be independently raised or lowered on slides or otherwise as described with respect to FIGS. 2 and 4 above. FIG. 6 shows the front and rear wheels 124, 126 above the waterline 540, in a retracted position, and shows the intermediate axles supporting a wheel 128 in a protracted position, extending below the hull 111. The vehicle 110 is shown standing with wheels 128 on the ground 520. This arrangement is advantageous in certain off-road scenarios, where the wheels 128 can engage the terrain surface even over rugged terrain.

In the embodiments described above, all of the wheels 12, 14; 124, 126, 128 may be driven. Alternatively, only the front wheels or the rear wheels 12; 124, 126 may be driven. The front wheels 12; 124, rear wheels 12; 126, or all road wheels 12, 14; 124, 126, 128 may be used to steer the vehicle 10; 110 on land. At least wheel 12, 14; 124, 126, 128 may in particular be driven, stopped (braked) or reversed in order to steer the vehicle 10; 110.

Figure 7:
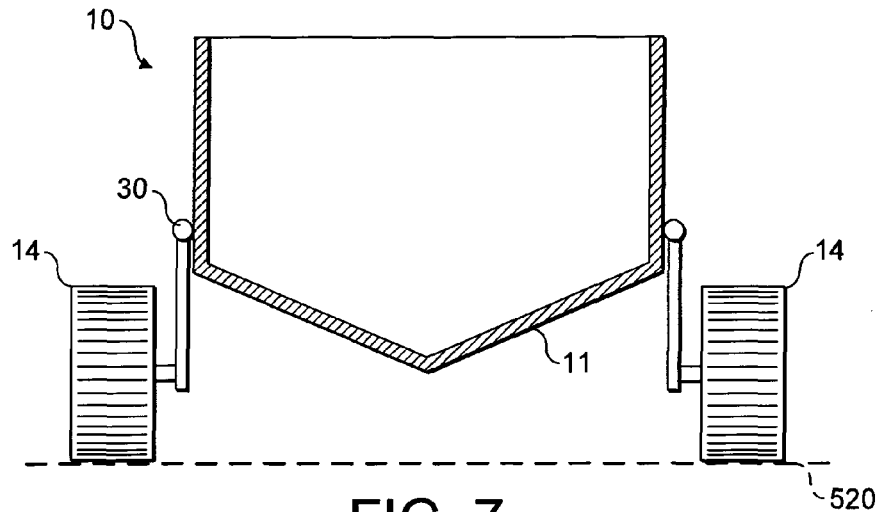
FIG. 7 is a schematic transverse cross-section view of a further embodiment of amphibious vehicle according to the present invention in a first state.

FIG. 7 shows an alternative means for raising and lowering the intermediate axles supporting a wheel 14. This may be used on any of the previously described embodiments. The intermediate axles supporting a wheel 14 are mounted on support members 30. The support members 30 extend vertically downwardly from the main structure when the intermediate axles supporting a wheel 14 are in the lowered position.

Figure 8:
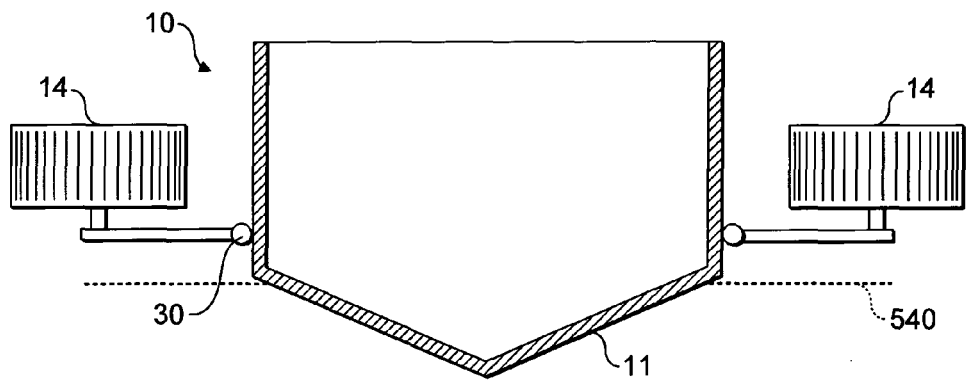
FIG. 8 is a schematic transverse cross-section view of the amphibious vehicle of FIG. 7 in a second state.

As shown in FIG. 8, the support members 30 are pivotally attached to the main structure, so that the intermediate axles supporting a wheel 14 can swing laterally outwardly in an arc. The intermediate axles supporting a wheel 14 rotate about one or more axes extending substantially longitudinally along the vehicle 10. The support members 30 can pivot to a horizontal orientation in order to lift the intermediate axles supporting a wheel 14 away from the hull 11 and above the waterline 540 of the vehicle 10. The retracted position is thus substantially perpendicular to the protracted position. In the retracted position the wheels 14 may act as fenders for the amphibious vehicle 10 when on the water.

All wheels 12, 14; 124, 126, 128 may also be raised or lowered by rotation in an arc as described above.

Figure 9:
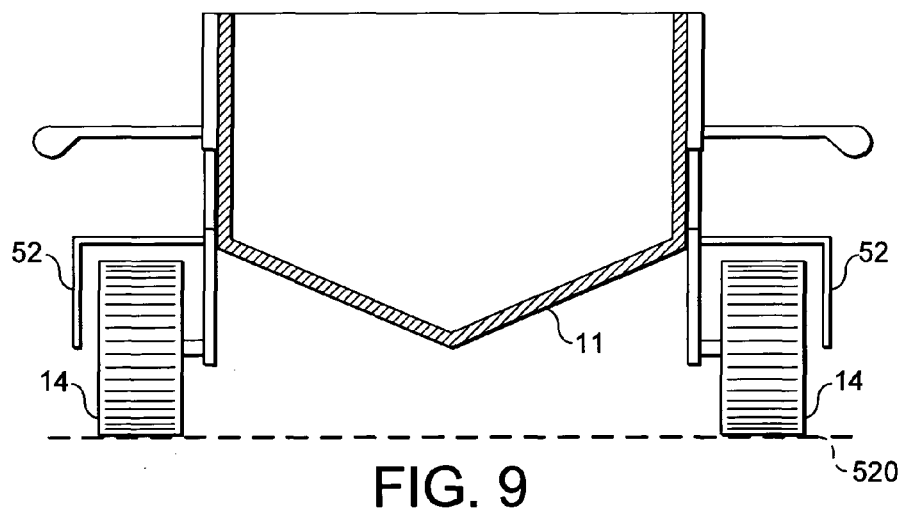
FIG. 9 is a schematic transverse cross-section view of a yet further embodiment of amphibious vehicle according to the present invention.

As shown in FIG. 9, mudguards 52 or spray guards 52 may be provided over the intermediate axles supporting a wheel 14. The mudguards 52 may be rigidly attached to the hull 11, such that the mudguards 52 do not move when the intermediate axles supporting a wheel 14 are raised and lowered. Alternatively, the mudguards 52 may be attached to the intermediate axles supporting a wheel 14 and/or slides such that the mudguards 52 are raised and lowered with the intermediate axles supporting a wheel 14 to stay a constant distance from the wheels 14.

Figure 10:
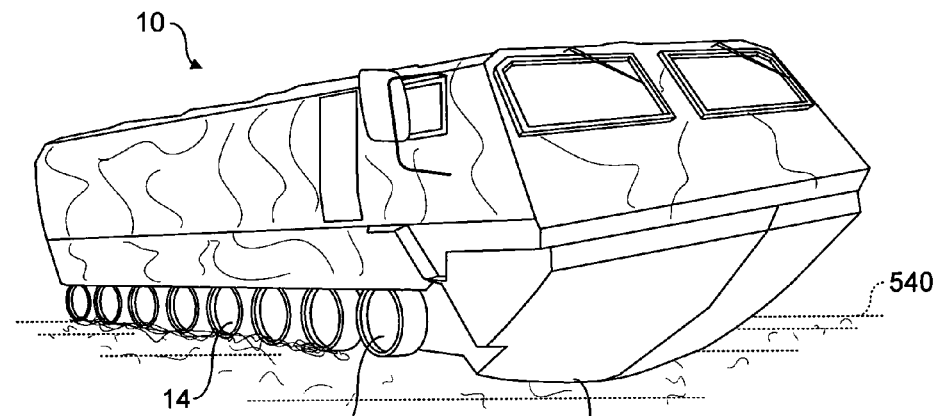
FIG. 10 is a perspective view of amphibious vehicle according to the present invention in use on water with all axles retracted.

FIG. 10 shows the vehicle 10 in use planing on water, with all wheels 12, 14 retracted.

Figure 11:
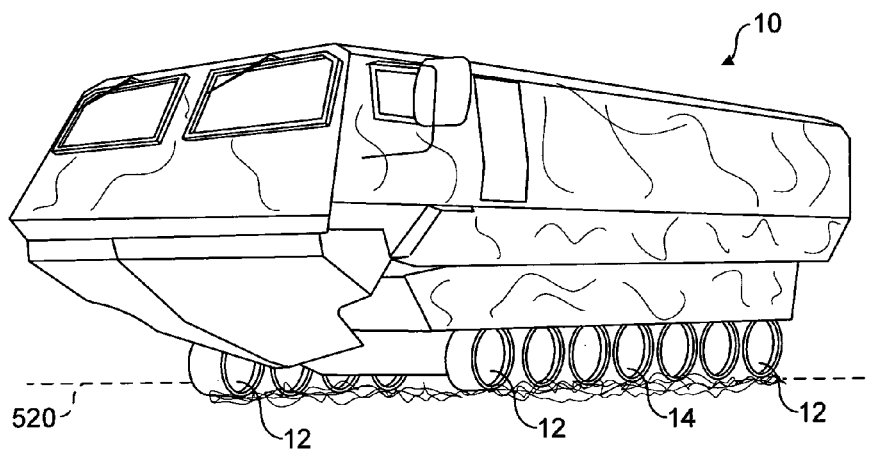
FIG. 11 is a further perspective view of the amphibious vehicle of FIG. 10 in use on land with all axles protracted.
Figure 12:
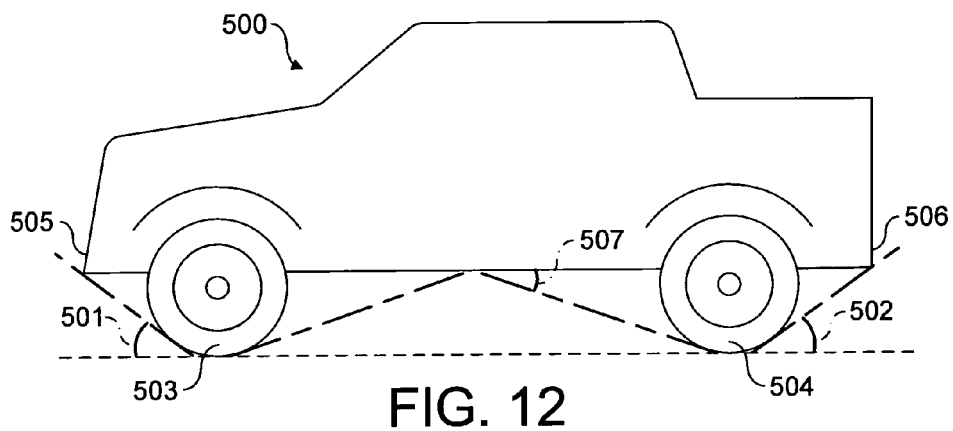
FIG. 12 is a schematic side elevation view of a prior art vehicle.

FIG. 11 shows the vehicle 10 in use on land, with all wheels 12, 14 protracted.

The wheels of any of the embodiments may be powered (so as to provide drive) by a mechanical transmission. Alternatively, the wheels may be powered by an electric transmission or a hydraulic transmission. Alternatively, the wheels may be powered by a transmission comprising mechanical and hydraulic elements. The hydraulic elements may be hydraulic wheel motors.

The wheels of any of the embodiments may be lowered on water; either to limit speed in crowded spaces e.g. harbours or marinas; in readiness for landing; or in areas such as swamps, where depth of water is unpredictable and constantly changing. Furthermore, where heavy marine growth in swamps may choke up a water jet intake.

Although it is envisaged that a vehicle according to the invention should be able to reverse on water, the shape of a typical planing hull, with a tapered bow and cut-off stern, indicates that there will be a forward direction of travel in which the vehicle can travel considerably faster than in reverse, due to the very different hydrodynamic resistance encountered in each direction. In general, an amphibious vehicle will have similar proportions to a road vehicle or boat, being approximately 1.5-5 times, preferably 2.5-4 times, longer than it is wide. The practical and legislative limits on width of road vehicles are a major influence here; as are the hydrodynamic characteristics of the hull. The conventional direction of travel of an amphibious vehicle is along its length.

Where reference herein is made to a "main structure" of the vehicle, this should be regarded as the hull for marine use; and as the body for land use.

Any of the embodiments described may be operated from a "forward control" driving position at the front of the vehicle, and preferably in front of the engine. With such a vehicle, there is very little bodywork forward of the windscreen— possibly just a bumper. Such a driving position offers excellent visibility on both land and water. The obvious drawbacks are visibility to hostile fire in military applications; and lack of crushable structure forward of the driver in case of collision.

A jet drive has been described as providing drive for the vehicle on water. Alternatively, a marine outdrive or propeller or propellers may be used. Providing a marine outdrive improves ease of conversion from a dedicated road vehicle. Alternatively, the vehicle may have two or more jet drives for propulsion on water.

The front, intermediate and rear wheels have been described as being driven for driving the vehicle on land. Alternatively, the certain wheels may be selectively driven or not driven at all.

Hydraulic rams have been described as raising or lowering the intermediate axles supporting a wheel. Alternatively, the intermediate axles supporting a wheel may be moved by threaded drives, hydraulic motors or other suitable means. Alternatively, the intermediate axles supporting a wheel may be raised and lowered by pneumatic rams or other pressurised air actuating means. The pneumatic rams may additionally provide for suspension springing of the vehicle. The pneumatic rams may additionally provide suspension damping for the vehicle.

Pivoted link arms or other linkages may be used between the actuating means and the intermediate axles and/or wheels as required.

The intermediate axles supporting a wheel have been described as mounted on either side of the hull. Alternatively, a single intermediate axle supporting a wheel may be provided centrally under the centreline of the hull. Alternatively, three intermediate axles supporting a wheel may be provided, one on each side of the, hull and one under the centreline of the hull. The intermediate axles supporting a wheel may be located either on the sides of the hull as shown, or partially or fully mounted underneath the hull.

A pair of front wheels and a pair of rear wheels have been described. Alternatively, the vehicle may have a pair of front wheels and a single, central, rear wheel. Alternatively, the vehicle may have a pair of rear wheels and a single, central, front wheel. Alternatively, the vehicle may have additional or fewer wheels than any of the particular embodiments shown, including in relation to the intermediate axles described. For example, the vehicle may be provided with just one wheel at each axle, i.e. just three wheels in all.

It will be appreciated from the foregoing that more than one intermediate axle may be provided. In every case, each and every axle may be retracted independently of the other or others, including where a plurality of intermediate axles are provided. Furthermore, an axle may in fact comprise two stub axles provided one on each opposite side of the vehicle, or just one stub axle provided on one side or other of the vehicle or at a location in-between.

Reference herein to the terms axle and axles simply infers something about which a wheel or wheels may rotate. An axle may comprise just one wheel supported on a wheel hub or stub axle. Alternatively, an axle may comprise two wheels supported on a traditional axle.

Although several embodiments of amphibian have been described above, any one or more or all of the features described (and/or claimed in the appended claims) may be provided in isolation or in various combinations in any of the embodiments. As such, any one or more these features may be removed, substituted and/or added to any of the feature combinations described and/or claimed. For the avoidance of doubt, any of the features of any embodiment may be combined with any other feature from any of the embodiments.

Whilst preferred embodiments of the present invention have been described above and illustrated in the drawings, these are by way of example only and non-limiting. It will be appreciated by those skilled in the art that many alternatives are possible within the ambit of the invention, as set out in the appended claims.

The invention claimed is:

1. An amphibious vehicle for use on land and on water, comprising land propulsion means and marine propulsion means, wherein the vehicle is adapted to plane on water and wherein the land propulsion means comprises at least two axles spaced apart along the length of the vehicle and at least one intermediate axle positioned therebetween, the at least one intermediate axle supporting at least one wheel being retractable independently of said at least two spaced apart axles to a position above the vehicle waterline for use of the vehicle on water and/or on land.

2. An amphibious vehicle as claimed in claim 1 wherein the at least two axles spaced apart along the length of the vehicle each support at least one wheel which may be retracted above the vehicle waterline for use of the vehicle on water and/or on land.

3. An amphibious vehicle as claimed in claim 1 wherein one or more of the axles are driven axles.

4. An amphibious vehicle as claimed in claim 3 wherein drive to one or more of the axles is selective.

5. An amphibious vehicle as claimed in claim 1 comprising a vee type hull.

6. An amphibious vehicle as claimed in claim 1 wherein the marine propulsion means comprises at least one jet drive.

7. An amphibious vehicle as claimed in claim 1 wherein at least one of the spaced apart axles is provided at a first proximal or front end of the vehicle and at least one of the spaced apart axles is provided at a second distal or rear end of the vehicle.

8. An amphibious vehicle as claimed in claim 1 wherein the at least one intermediate axle is provided towards the rear of the vehicle.

9. An amphibious vehicle as claimed in claim 1 wherein the at least one intermediate axle is provided towards the front of the vehicle.

10. An amphibious vehicle as claimed in claim 2 wherein the at least one supported wheel of the at least one intermediate axle is provided in line with the supported wheels of the at least two spaced apart axles along a longitudinal axis running fore and aft along the vehicle.

11. An amphibious vehicle as claimed in claim 2 wherein the at least one supported wheel of at the least one intermediate axle is not in line longitudinally with the supported wheels of the at least two spaced apart axles.

12. An amphibious vehicle as claimed in claim 1 wherein the at least one intermediate axle comprises an plurality of intermediate axles each supporting at least one wheel and being retractable independently of the or each other intermediate axle and/or the other axles of the vehicle.

13. An amphibious vehicle as claimed in claim 12 wherein the supported wheels of the plurality of intermediate axles are provided in line with one another along a longitudinal axis running fore and aft along the vehicle.

14. An amphibious vehicle as claimed in claim 12 wherein the supported wheels of the plurality of intermediate axles are not in line longitudinally with one another.

15. An amphibious vehicle as claimed in claim 1 wherein the land propulsion means are powered by a mechanical transmission.

16. An amphibious vehicle as claimed in claim 1 wherein the land propulsion means are powered by an electric transmission.

17. An amphibious vehicle as claimed in claim 1 wherein the land propulsion means are powered by a hydraulic transmission.

18. An amphibious vehicle as claimed in claim 1 wherein the land propulsion means are powered by a transmission comprising mechanical and hydraulic elements.

19. An amphibious vehicle as claimed in claim 18 wherein the hydraulic elements comprise hydraulic wheel motors.

20. An amphibious vehicle as claimed in claim 1 wherein the at least one intermediate axle is retractable substantially vertically.

21. An amphibious vehicle as claimed in claim 1 wherein the at least one intermediate axle is retractable about one or more axes running fore and aft along the length of the vehicle, so that each intermediate axle retracts in an arc about said axes.

22. An amphibious vehicle as claimed in claim 21 wherein the retracted position of the axis of the at least one intermediate axle is substantially perpendicular to its protracted position.

23. An amphibious vehicle as claimed in claim 1 wherein the at least one intermediate axle is retracted by means of threaded drives.

24. An amphibious vehicle as claimed in claim 1 wherein the at least one intermediate axle is retracted by means of hydraulic rams or pneumatic rams.

25. An amphibious vehicle as claimed in claim 24 wherein the hydraulic rams or pneumatic rams also provide vehicle suspension springing.

26. An amphibious vehicle as claimed in claim 24 wherein the hydraulic rams or pneumatic rams also provide vehicle suspension damping.

27. An amphibious vehicle as claimed in claim 1 wherein the at least one intermediate axle has guide elements which locate in tubes attached to a main vehicle structure which guide the retraction of the at least one intermediate axle.

28. An amphibious vehicle as claimed in claim 27 wherein the tubes are attached to each other in pairs across the width of the vehicle by attachment elements.

29. An amphibious vehicle as claimed in claim 1 wherein the at least one intermediate axle has guide elements which locate in slides attached to a main vehicle structure which guide the retraction of the at least one intermediate axle.

30. An amphibious vehicle as claimed in claim 29 wherein the slides are attached to each other in pairs across the width of the vehicle by attachment elements.

31. An amphibious vehicle as claimed in claim 28 wherein a vehicle cover or roof is attached to the attachment elements.

32. An amphibious vehicle as claimed in claim 1 wherein the wheel or wheels of the at least one intermediate axle has a mudguard fitted above.

33. An amphibious vehicle as claimed in claim 32 wherein the mudguard is attached so as to retract with the at least one intermediate axle.

34. An amphibious vehicle as claimed in claim 1 wherein the vehicle is provided with a forward control driving position.

35. An amphibious vehicle as claimed in claim 1 wherein the, some or each of the at least one intermediate axle supporting at least one wheel may be independently retracted in or for use of the vehicle on land.

36. An amphibious vehicle as claimed in claim 1 wherein the, some or each of the at least one intermediate axle supporting at least one wheel may be used to steer the vehicle.

37. An amphibious vehicle as claimed in claim 1 wherein the, some or each of the at least one intermediate axle supporting at least one wheel may be stopped or braked in order to steer the vehicle.

38. An amphibious vehicle as claimed in claim 1 wherein the, some or each of the at least one intermediate axle supporting at least one wheel may be reversed in order to steer the vehicle.

39. An amphibious vehicle for use on land and on water, comprising land propulsion means, marine propulsion means, at least two wheels spaced apart along the length of the vehicle and at least one intermediate wheel positioned therebetween, wherein the at least one intermediate wheel is retractable in use of the vehicle on water and/or on land independently of said at least two spaced apart wheels and wherein the vehicle is adapted to plane on water.

40. An amphibious vehicle as claimed in claim 39 wherein the at least two wheels spaced apart along the length of the vehicle are retractable in use of the vehicle on water and/or on land.

41. An amphibious vehicle as claimed in claim 39 wherein each retractable wheel is retractable independently of each other retractable wheel in use of the vehicle on water and/or on land.

42. An amphibious vehicle as claimed in claim 39 wherein each pair of retractable wheels is retractable independently of each other retractable wheel or pair of retractable wheels in use of the vehicle on water and/or on land.

* * * * *